(12) United States Patent
Ko et al.

(10) Patent No.: US 11,844,066 B2
(45) Date of Patent: Dec. 12, 2023

(54) METHOD AND DEVICE FOR ALLOCATING SIDELINK RESOURCE IN NR V2X

(71) Applicant: LG Electronics Inc., Seoul (KR)

(72) Inventors: Woosuk Ko, Seoul (KR); Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/918,190

(22) PCT Filed: Apr. 8, 2021

(86) PCT No.: PCT/KR2021/004445
§ 371 (c)(1),
(2) Date: Mar. 20, 2023

(87) PCT Pub. No.: WO2021/206483
PCT Pub. Date: Oct. 14, 2021

(65) Prior Publication Data
US 2023/0309086 A1 Sep. 28, 2023

Related U.S. Application Data

(60) Provisional application No. 63/061,737, filed on Aug. 5, 2020, provisional application No. 63/008,559, filed
(Continued)

(30) Foreign Application Priority Data

Aug. 4, 2020 (KR) .................. 10-2020-0097263

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04W 72/40* (2023.01); *H04W 76/28* (2018.02)

(58) Field of Classification Search
CPC . H04W 72/1263; H04W 72/40; H04W 76/28; H04W 92/18; H04L 1/1812
See application file for complete search history.

(56) References Cited

U.S. PATENT DOCUMENTS

2020/0403737 A1* 12/2020 Yeo .................. H04L 1/1861
2021/0006318 A1* 1/2021 Kim .................. H04L 1/1867
(Continued)

FOREIGN PATENT DOCUMENTS

KR 20200036995 4/2020

OTHER PUBLICATIONS

Ericsson, "Feature lead summary#3 on Resource allocation for NR sidelink Mode 1," R1-2001285 (revision of R1-2000779), Presented at 3GPP TSG-RAN WG1 Meeting #100, e-Meeting, Feb. 24-Mar. 6, 2020, 41 pages.
(Continued)

*Primary Examiner* — Raj Jain
(74) *Attorney, Agent, or Firm* — Fish & Richardson P.C.

(57) ABSTRACT

Proposed is a method for performing wireless communication by a first device. The method may comprise the steps of: receiving, from a base station, information related to a configured grant (CG) for scheduling a sidelink resource; and on the basis of the information related to the CG, performing sidelink transmission to a second device on the basis of a sidelink resource allocated by the CG. For example, the information related to the CG may include information relating to an offset related to the CG and information relating to a period related to the CG. For example, the sidelink resource allocated by the CG may be
(Continued)

positioned in a slot spaced apart by the offset related to the CG from the closest logical sidelink slot after a time point at which a system frame number (SFN) corresponds to 0.

16 Claims, 21 Drawing Sheets

Related U.S. Application Data on Apr. 10, 2020, provisional application No. 63/007,908, filed on Apr. 9, 2020, provisional application No. 63/007,915, filed on Apr. 9, 2020.

(51) Int. Cl.
*H04W 72/40* (2023.01)
*H04W 76/28* (2018.01)

(56) References Cited

U.S. PATENT DOCUMENTS

| | | | | |
|---|---|---|---|---|
| 2021/0014893 A1* | 1/2021 | Park | ............... | H04W 80/08 |
| 2021/0227604 A1* | 7/2021 | Huang | ............... | H04W 72/02 |
| 2022/0159724 A1* | 5/2022 | Fan | ............... | H04L 5/0094 |
| 2022/0369360 A1* | 11/2022 | Zhao | ............... | H04W 72/02 |
| 2023/0019726 A1* | 1/2023 | Kwon | ............... | H04L 1/0026 |
| 2023/0087401 A1* | 3/2023 | Shin | ............... | H04L 5/0037 370/329 |

OTHER PUBLICATIONS

Ericsson, "Feature lead summary#4 on Resource allocation for NR sidelink Mode 1," R1-2001367 (Revision of R1-2001285), Presented at 3GPP TSG-RAN WG1 Meeting #100, e-Meeting, Feb. 24-Mar. 6, 2020, 40 pages.
Huawei et al., "Sidelink resource allocation mode 1," R1-1910055, Presented at 3GPP TSG RAN WG1 Meeting #98bis, Chongqing, China, Oct. 14-20, 2019, 19 pages.
Huawei et al., "Remaining details of sidelink resource allocation mode 1," R1-2000182, Presented at 3GPP TSG RAN WG1 Meeting #100-e, Feb. 24-Mar. 6, 2020, 12 pages.
LG Electronics, "Discussion on configured grant for NR-U," R1-1910822, Presented at 3GPP TSG RAN WG1 Meeting #98bis, Chongqing, China, Oct. 14-20, 2019, 9 pages.
LG Electronics, "Discussion on NR sidelink resource allocation for Mode 1," R1 1912587, Presented at 3GPP TSG RAN WG1 #99 Meeting, Reno, US, Nov. 18-22, 2019, 18 pages.
LG Electronics, "Discussion on NR sidelink resource allocation for Mode 1," R1-2000782, Presented at 3GPP TSG RAN WG1 #100, E-Meeting, Feb. 24-Mar. 6, 2020, 27 pages.
LG Electronics, "Discussion on NR sidelink resource allocation for Mode 1," R1-2001153, Presented at 3GPP TSG RAN WG1 #100, E-Meeting, Feb. 24-Mar. 6, 2020, 30 pages.
NEC, "Mode 1 resource allocation mechanism for NR sidelink," R1-1911027, Presented at 3GPP TSG RAN WG1 #98bis, Chongqing, China, Oct. 14-20, 2019, 4 pages.
Notice of Allowance in Korean Appln No. 10-2022-7035128, dated Mar. 6, 2023, 9 pages (with English translation).
Office Action in Korean Appln. No. 10-2022-7035128, dated Nov. 18, 2022, 10 pages (with English translation).
Ericsson, "Feature lead summary# 4 on Resource allocation for NR sidelink Mode 1," R1-2001367, Presented at 3GPP TSG RAN WG1 Meeting # 100, e-Meeting, Feb. 24-Mar. 6, 2020, 40 pages.
Huawei, HiSilicon, "Remaining details of sidelink resource allocation mode 1," R1-2000182, Presented at 3GPP TSG RAN WG1 Meeting #100-e, Feb. 24-Mar. 6, 2020, 12 pages.
Office Action in Korean Appln. No. 10-2022-7035128, dated Nov. 18, 2022, 11 pages (with English translation).
Huawei et al., "Method to avoid confusion between UE and network for CG type 1," 3GPP TSG-RAN WG2 Meeting #109 electronic, R2-2000431, Feb. 24-Mar. 6, 2020, 3 pages.
Nokia et al., "Remaining issues on TSC scheduling," 3GPP TSG-RAN WG2 Meeting #109-e, R2-2001049, Online, Feb. 24-Mar. 6, 2020, 8 pages.
OPPO, "SFN misalignment issue on periodicities of non-divisor of 10240ms," 3GPP TSG-RAN WG2 Meeting #109 electronic, R2-2000697, Feb. 24-Mar. 6, 2020, 5 pages.
Sequans Communications, "Impact of CG/SPS with periodicities non dividing HF length," 3GPP TSG-RAN WG2 Meeting #109-e, R2-2001627, Elbonia, Feb. 24-Mar. 6, 2020, 8 pages.

* cited by examiner

FIG. 10

| DFN=K-1 | DFN=0 | DFN=1 |

SNF=0

| SL slot #0 | SL slot #1 | SL slot #2 | SL slot #3 | SL slot #0 | SL slot #1 | SL slot #2 | SL slot #3 | SL slot #0 | SL slot #1 | SL slot #2 | SL slot #3 |

| V_slot #0 | V_slot #1 | V_slot #2 | V_slot #3 | V_slot #0 | V_slot #1 | V_slot #2 | V_slot #3 | V_slot #0 | V_slot #1 | V_slot #2 | V_slot #3 |

| V_frame #0 | V_frame #1 | V_frame #2 |

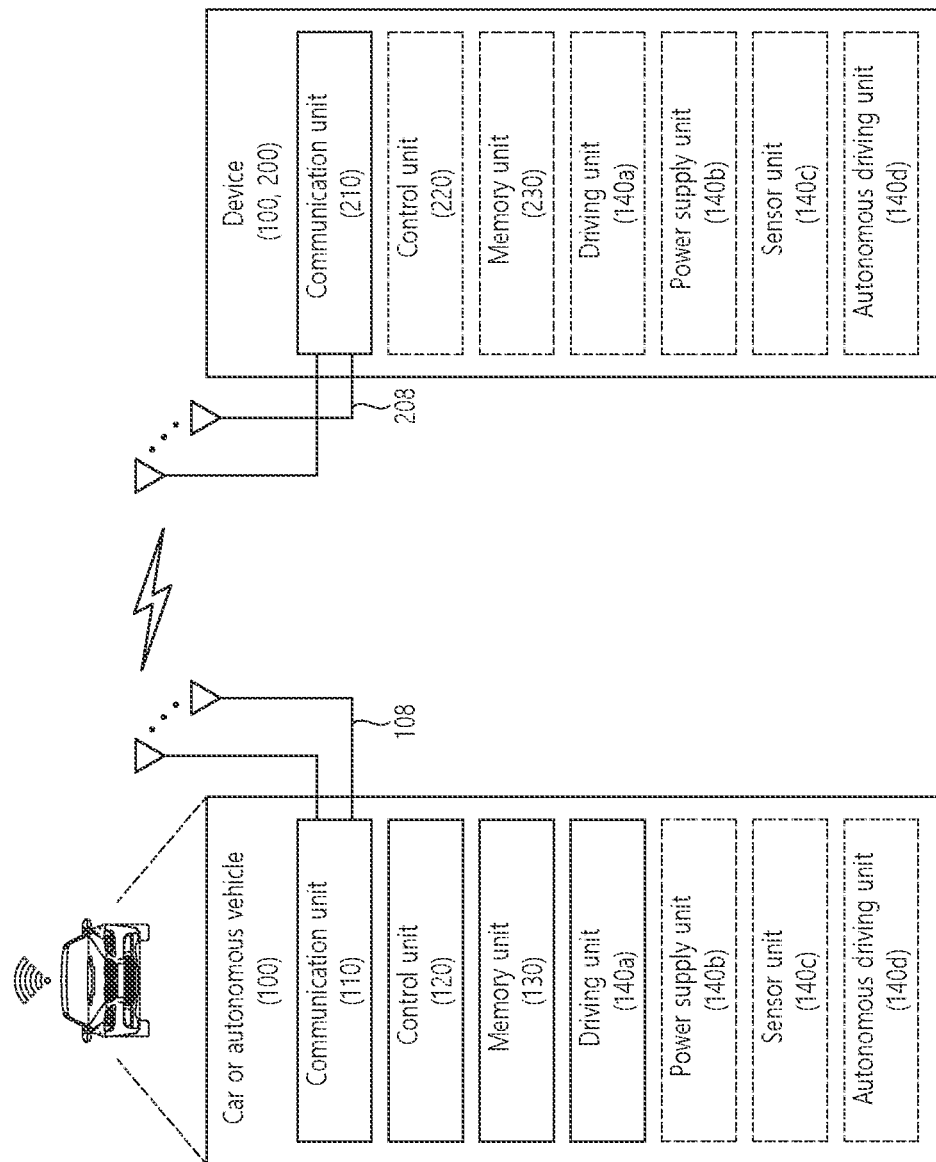

METHOD AND DEVICE FOR ALLOCATING SIDELINK RESOURCE IN NR V2X

CROSS-REFERENCE TO RELATED APPLICATIONS

This application is a National Stage application under 35 U.S.C. § 371 of International Application No. PCT/KR2021/004445, filed on Apr. 8, 2021, which claims the benefit of U.S. Provisional Application No. 63/007,908, filed on Apr. 9, 2020, U.S. Provisional Application No. 63/007,915, filed on Apr. 9, 2020, U.S. Provisional Application No. 63/008,559, filed on Apr. 10, 2020, U.S. Provisional Application No. 63/061,737, filed on Aug. 5, 2020 and Korean Patent Application No. 10-2020-0097263, filed on Aug. 4, 2020. The disclosures of the prior applications are hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in the sidelink (SL) mode 1 operation, the base station may configure periodic resources to the UE through a configured grant (CG). In this case, for example, the base station may configure a period and an offset of CG type-1 resources to the UE through RRC signaling. In this case, since direct frame number (DFN)-based timing is used in the SL operation of the UE, the DFN-based timing may not be synchronized with system frame number (SFN)-based timing used in Uu link for communication between the base station and the UE.

In one embodiment, provided is a method for performing wireless communication by a first device. The method may comprise: receiving, from a base station, information related to a configured grant (CG) for scheduling sidelink resources; and performing, to a second device, sidelink transmission based on the sidelink resources allocated by the CG based on the information related to the CG.

In one embodiment, provided is a first device adapted to perform wireless communication. The first device may comprise: one or more memories storing instructions; one or more transceivers; and one or more processors connected to the one or more memories and the one or more transceivers. The one or more processors may execute the instructions to: receive, from a base station, information related to a configured grant (CG) for scheduling sidelink resources; and perform, to a second device, sidelink transmission based on the sidelink resources allocated by the CG based on the information related to the CG.

For example, the information related to the CG may include information on an offset related to the CG and information on a period related to the CG. For example, the sidelink resources allocated by the CG may be located after the offset related to the CG from a closest logical sidelink slot after a time when a system frame number (SFN) is 0. For example, the sidelink resources allocated by the CG may be repeated in the period related to the CG. For example, the period related to the CG and the offset related to the CG may be units of a logical sidelink slot. For example, the logical sidelink slot may be a resource in a sidelink resource pool.

The UE can efficiently perform SL communication.

BRIEF DESCRIPTION OF THE DRAWINGS

FIG. 10 shows an example of determining a time when a virtual frame number is 0 from a time when SFN is 0, based on an embodiment of the present disclosure.

FIG. 21 shows a vehicle or an autonomous vehicle, based on an embodiment of the present disclosure.

DETAILED DESCRIPTION

Figure 1:
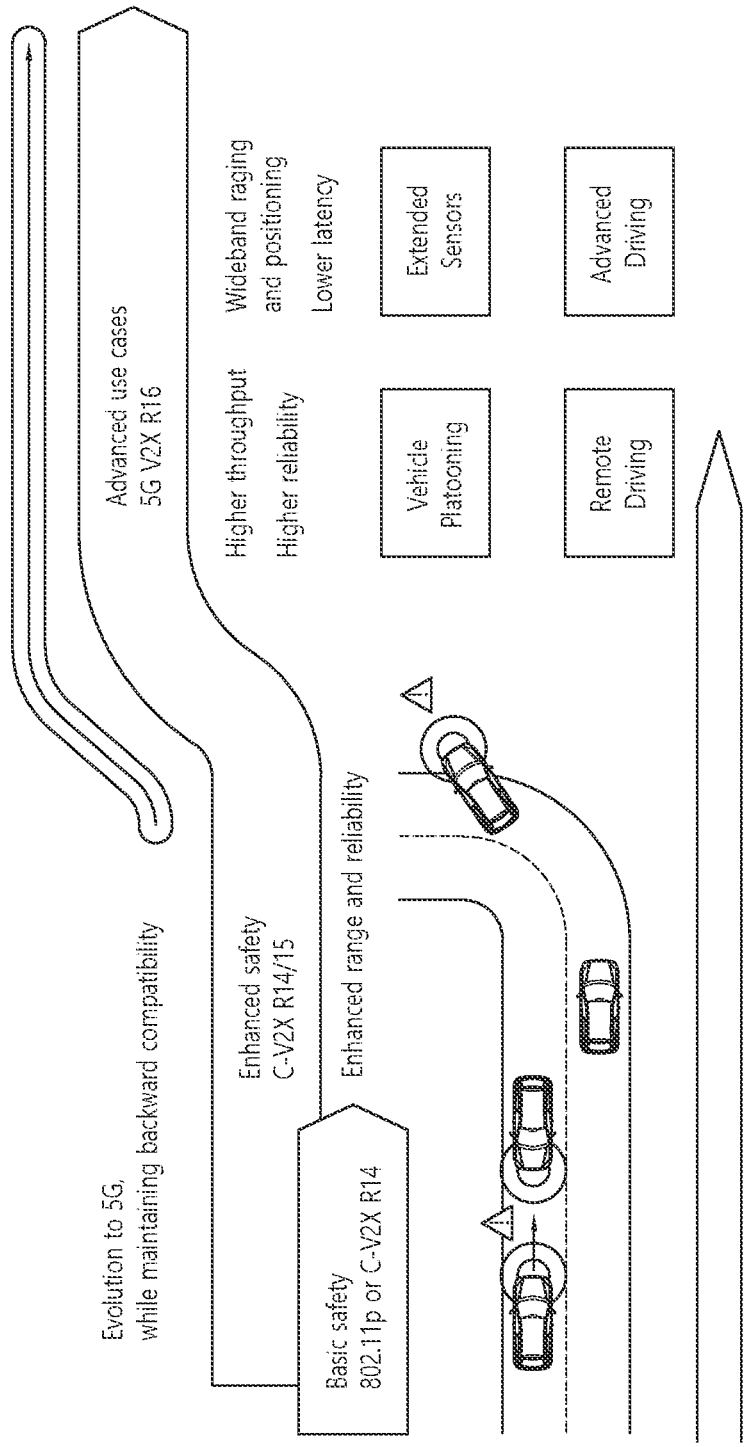
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
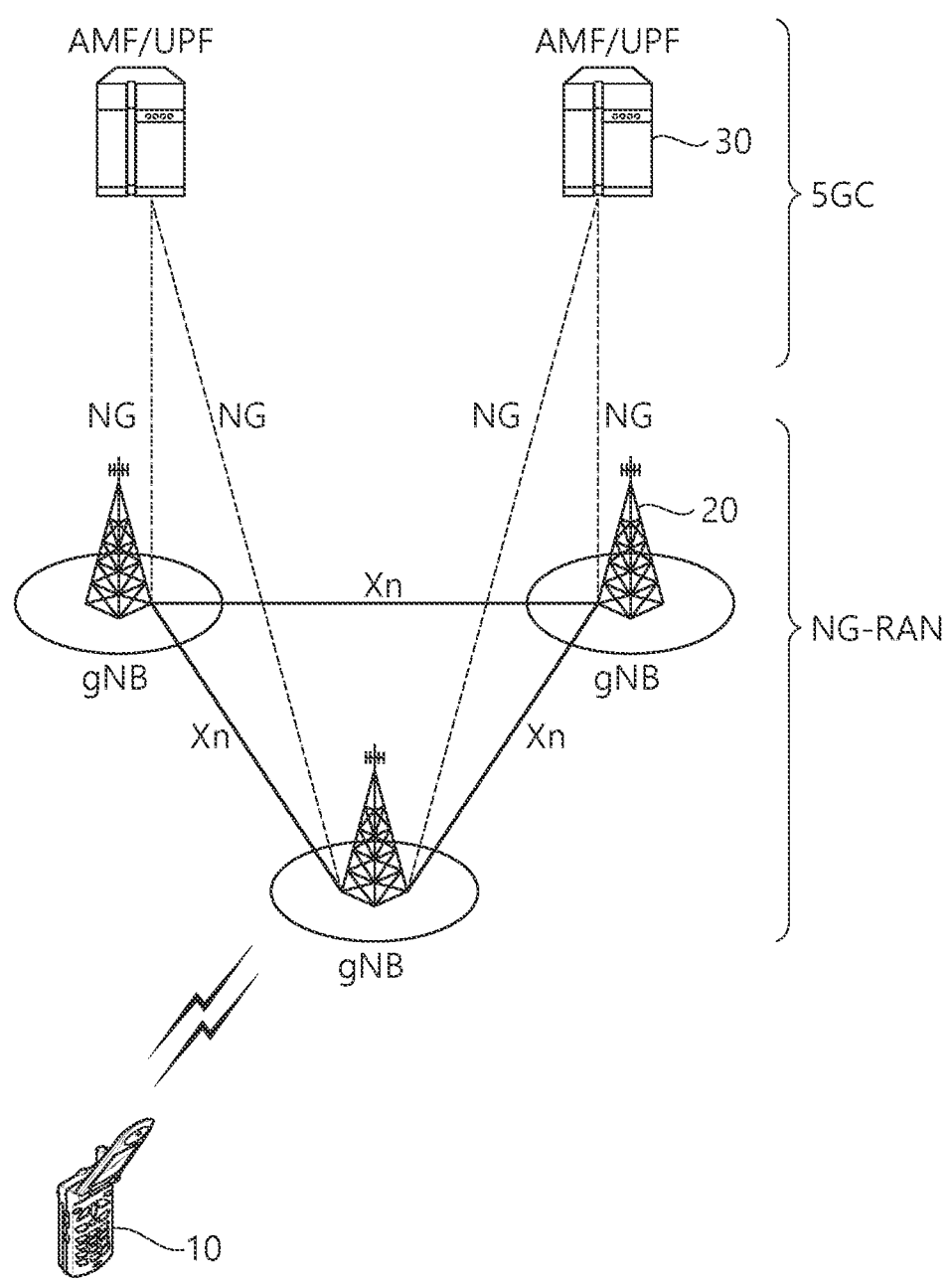
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
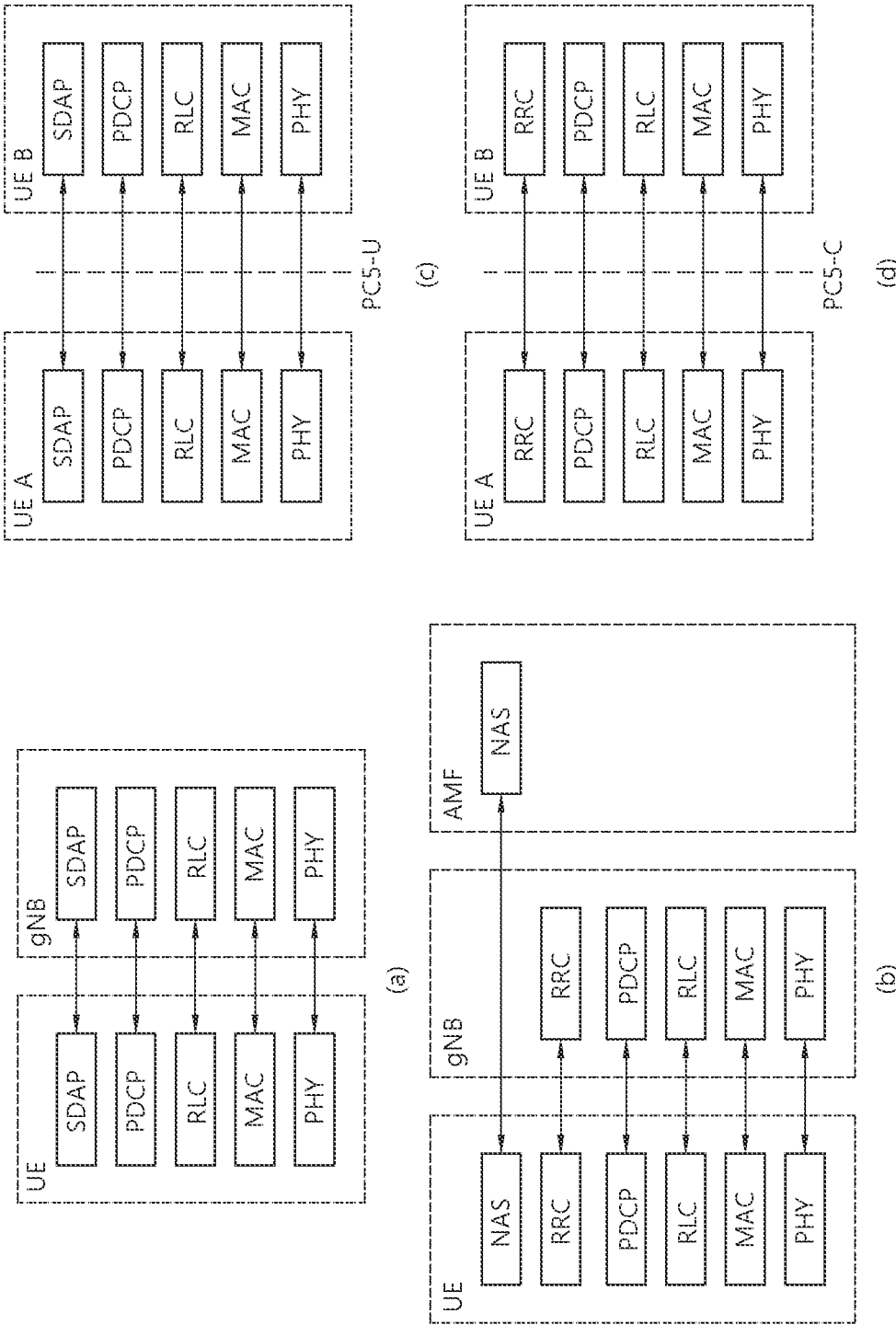
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
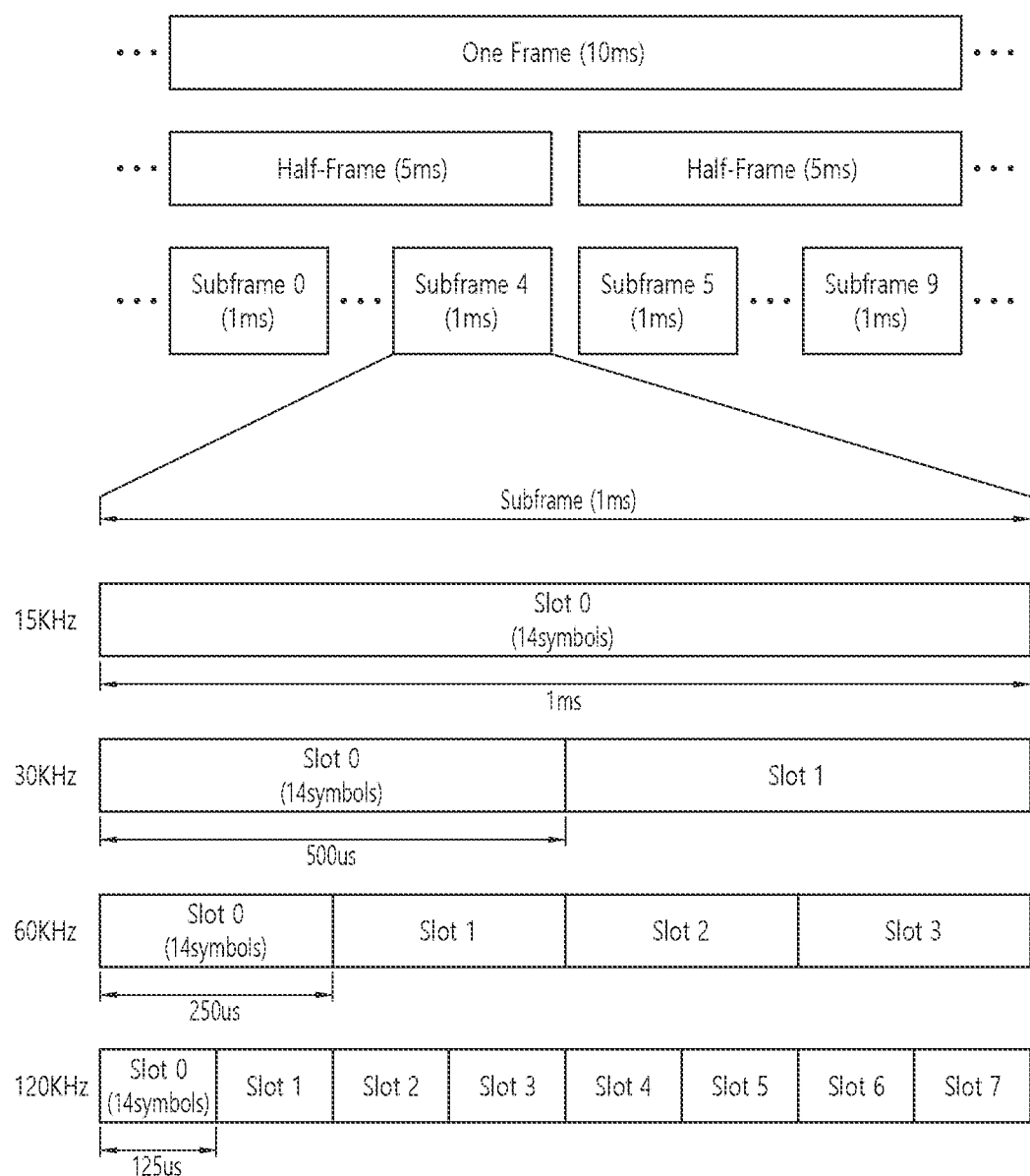
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
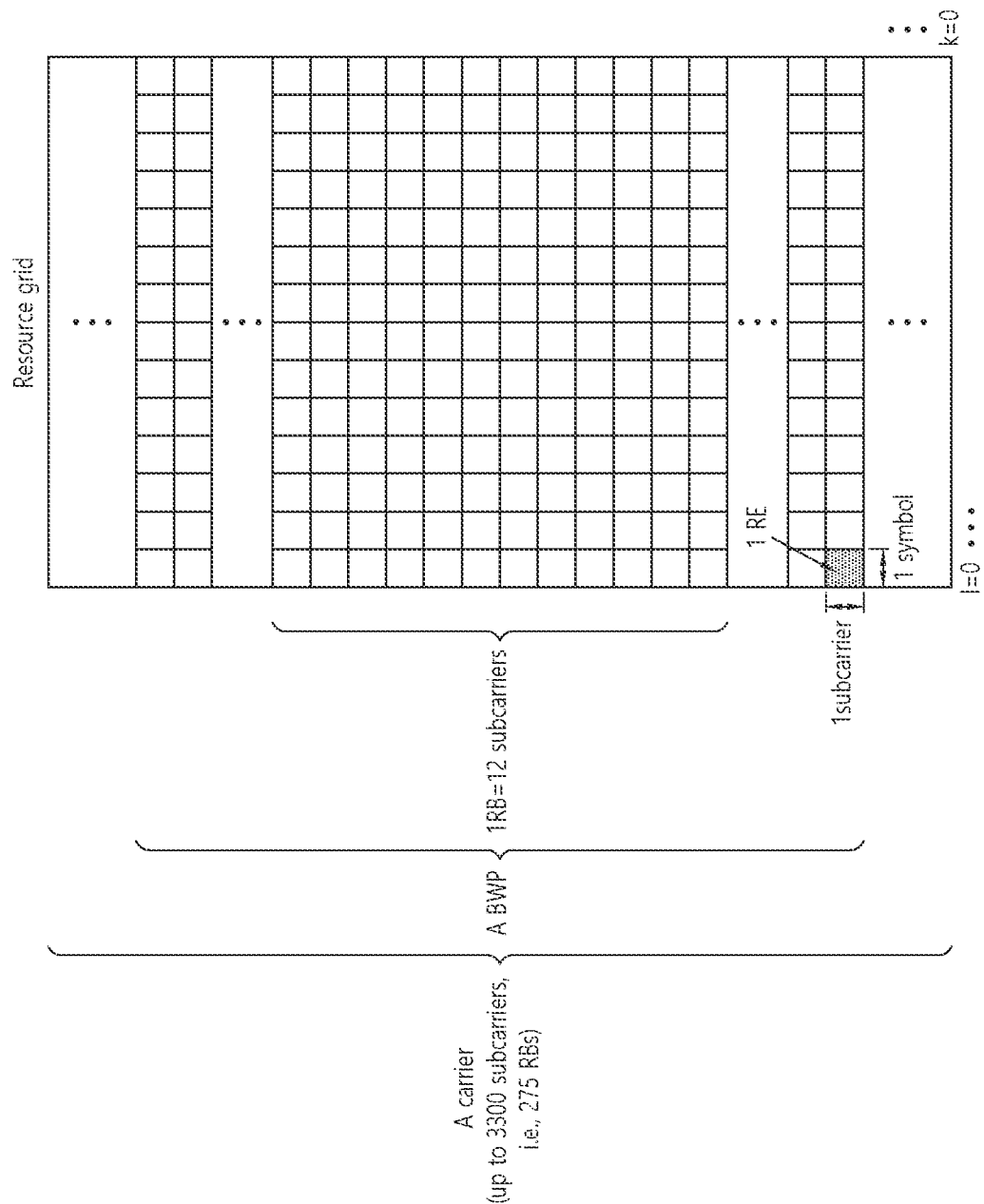
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
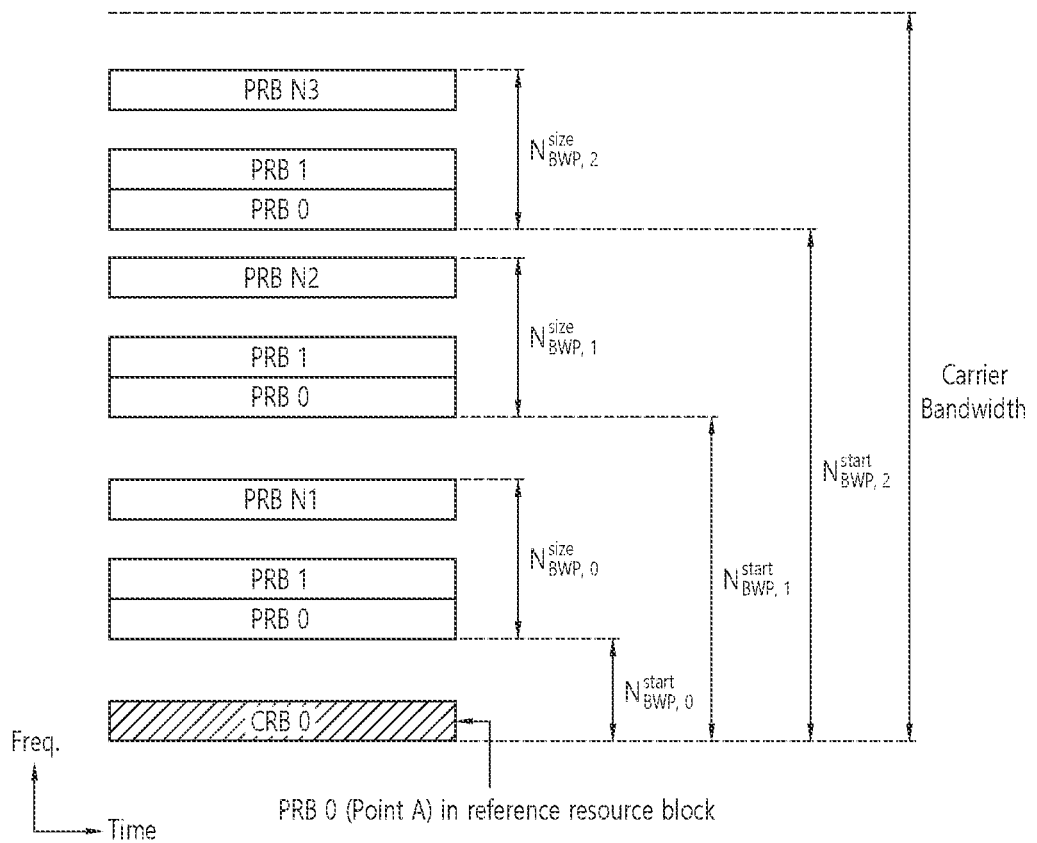
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
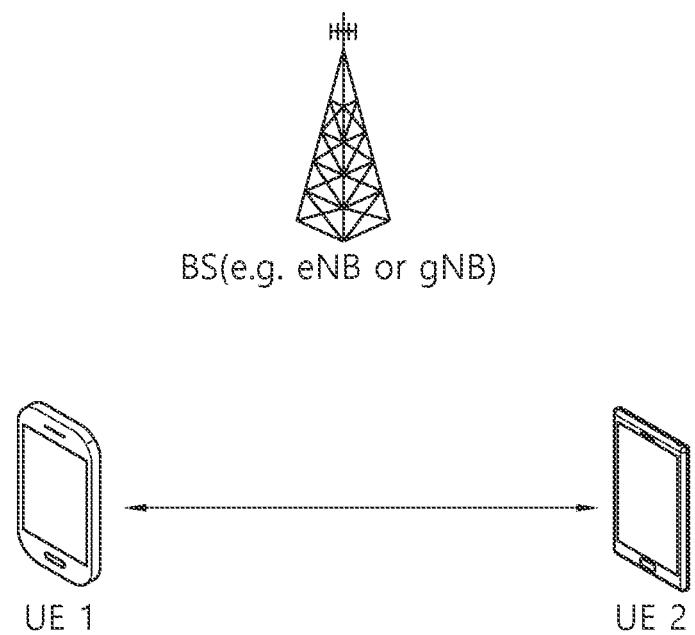
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
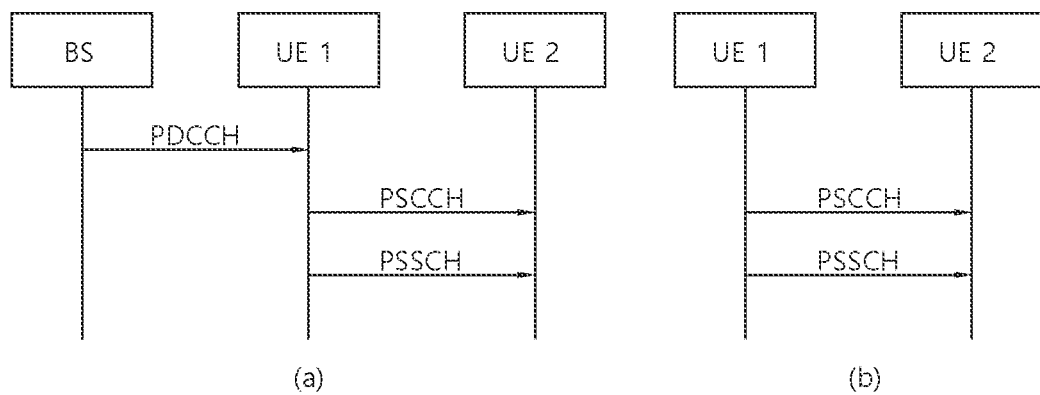
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
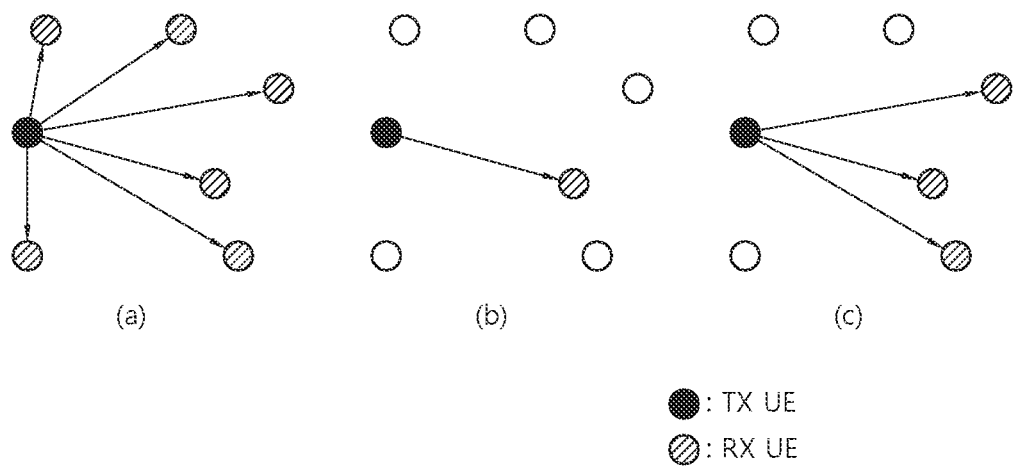
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

The SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes a related PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

In the sidelink (SL) mode 1 operation, the base station may configure periodic resources to the UE through a configured grant (CG). In this case, for example, the base station may configure a period and an offset of CG type-1 resources to the UE through RRC signaling. In this case, since direct frame number (DFN)-based timing is used in the SL operation of the UE, the DFN-based timing may not be synchronized with system frame number (SFN)-based timing used in Uu link for communication between the base station and the UE.

In the present disclosure, as in the above-described problem, proposed is a method for solving the ambiguity in which the base station and the UE differently understand SL CG type-1 resources configured based on Uu link timing of the base station, due to the timing mismatch between Uu link and SL.

Based on an embodiment, the base station and/or the UE may assume/expect that SFN=0 based on downlink (DL) timing used for sidelink (SL) mode 1 scheduling and DFN=0 based on SL timing used for SL communication are aligned with each other.

Based on an embodiment, if a time corresponding to DL SFN=0 and a time corresponding to SL DFN=0 are aligned with each other or are not aligned, the UE may consider a logical SL slot/symbol which is the earliest in time from a start time of a frame corresponding to DL SFN=0 as a reference point corresponding to time domain offset (hereinafter, timeDomainOffset)=0. For example, if a time corresponding to DL SFN=0 and a time corresponding to SL DFN=0 are aligned with each other or are not aligned, the UE may assume a structure of a virtual physical frame having a physical slot/symbol, which is the earliest in time from a start time of a frame corresponding to DL SFN=0 when SL numerology is applied, as the first slot/symbol of the virtual physical frame, wherein a frame number of the virtual physical frame having the physical slot/symbol is 0. In addition, the UE may assume a structure of a physical subframe and a physical slot/symbol according to the structure of the virtual physical frame. Thereafter, the UE may consider a logical SL slot/symbol which is the earliest in time from a start time of virtual physical frame number=0 as a reference point corresponding to timeDomainOffset=0. Herein, for example, a start time corresponding to virtual physical frame number=0 may be the same as a start time of a frame corresponding to DL SFN=0. For example, the logical SL slot/symbol may refer to a physical slot/symbol belonging to a SL resource pool. For example, it may be considered that CG type-1 resources, which are started from a time spaced apart by a value of timeDomainOffset from the start time of the logical SL slot/symbol corresponding to the reference point and periodically repeated with periodicity, are configured by the base station to the UE. For example, the base station may configure the UE such that a time spaced apart by a value of timeDomainOffset from the start time of the logical SL slot/symbol corresponding to the reference point is the start time of CG type-1 resources repeated in a specific period.

Based on an embodiment, timeDomainOffset may be determined/defined as the number of logical SL slots/symbols. Or, for example, timeDomainOffset may be determined/defined as the number of physical slots/symbols based on SL numerology. Or, for example, timeDomainOffset may be determined/defined as the number of physical slots/symbols based on DL numerology. Based on an embodiment, the periodicity may be determined/defined as the number of logical SL slots/symbols. Or, for example, the periodicity may be determined/defined as the number of physical slots/symbols based on SL numerology. Or, for example, the periodicity may be determined/defined as the number of physical slots/symbols based on DL numerology.

Based on an embodiment, if a time corresponding to DL SFN=0 and a time corresponding to SL DFN=0 are aligned with each other or are not aligned, the UE may consider a logical SL slot/symbol, which is the earliest in time from a start time corresponding to physical SL frame number=0 which is the earliest in time from a start time of a frame corresponding to DL SFN=0 when SL numerology and SL DFN timing are applied, as a reference point corresponding to timeDomainOffset=0. For example, it may be considered that CG type-1 resources, which are started from a time spaced apart by a value of timeDomainOffset from the start time of the logical SL slot/symbol corresponding to the reference point and periodically repeated with periodicity, are configured by the base station to the UE. For example, the base station may configure the UE such that a time spaced apart by a value of timeDomainOffset from the start time of the logical SL slot/symbol corresponding to the reference point is the start time of CG type-1 resources repeated in a specific period.

Based on an embodiment, if a time corresponding to DL SFN=0 and a time corresponding to SL DFN=0 are aligned with each other or are not aligned, the UE may consider a logical SL slot/symbol, which is the earliest in time from a start time of a frame corresponding to SL DFN=0 when SL numerology is applied, as a reference point corresponding to timeDomainOffset=0. For example, it may be considered that CG type-1 resources, which are started from a time spaced apart by a value of timeDomainOffset from the start time of the logical SL slot/symbol corresponding to the reference point and periodically repeated with periodicity, are configured by the base station to the UE. For example, the base station may configure the UE such that a time spaced apart by a value of timeDomainOffset from the start time of the logical SL slot/symbol corresponding to the reference point is the start time of CG type-1 resources repeated in a specific period.

Based on an embodiment, if a time corresponding to DL SFN=0 and a time corresponding to SL DFN=0 are aligned with each other or are not aligned, the UE may assume virtual DL CG type-1 resources, which are started from a time spaced apart by a value of timeDomainOffset represented by the number of physical slots/symbols from a start time of a frame corresponding to DL SFN=0 and periodically repeated with periodicity represented by the number of physical slots/symbols. Thereafter, the UE may consider that the base station has configured to use logical SL slots/symbols, which are the earliest in time from the start time of the virtual DL CG type-1 resources, as SL CG type-1 resources.

Based on an embodiment, if a time corresponding to DL SFN=0 and a time corresponding to SL DFN=0 are aligned with each other or are not aligned, the UE may assume a structure of a virtual physical frame having a physical slot/symbol, which is the earliest in time from a start time of a frame corresponding to DL SFN=0 when SL numerology is applied, as the first slot/symbol of the virtual physical frame, wherein a frame number of the virtual physical frame having the physical slot/symbol is 0. In addition, the UE may assume a structure of a physical subframe and a physical slot/symbol according to the structure of the virtual physical frame. Thereafter, the UE may assume that virtual SL CG type-1 resources, which are started from a time spaced apart by a value of timeDomainOffset represented by the number of physical slots/symbols from a start time corresponding to virtual physical frame number=0 and periodically repeated with periodicity represented by the number of physical slots/symbols. Thereafter, the UE may consider that the base station has configured to use logical SL slots/symbols, which are the earliest in time from the virtual SL CG type-1 resources, as SL CG type-1 resources.

Based on an embodiment, if a time corresponding to DL SFN=0 and a time corresponding to SL DFN=0 are aligned with each other or are not aligned, the UE may assume virtual SL CG Type-1 resources, which are started from a time spaced apart by a value of timeDomainOffset represented by the number of physical slots/symbols from a start time corresponding to physical SL frame number=0 which is the earliest in time from a start time of a frame corresponding to DL SFN=0 when SL numerology and SL DFN timing are applied and periodically repeated with periodicity represented by the number of physical slots/symbols. Thereafter, the UE may consider that the base station has configured to use logical SL slots/symbols, which are the earliest in time from the virtual SL CG type-1 resources, as SL CG type-1 resources.

Based on an embodiment, if a time corresponding to DL SFN=0 and a time corresponding to SL DFN=0 are aligned with each other or are not aligned, the UE may assume virtual SL CG Type-1 resources, which are started from a time spaced apart by a value of timeDomainOffset represented by the number of physical slots/symbols from a start time of a frame corresponding to SL DFN=0 and periodically repeated with periodicity represented by the number of physical slots/symbols. Thereafter, the UE may consider that the base station has configured to use logical SL slots/symbols, which are the earliest in time from the virtual SL CG type-1 resources, as SL CG type-1 resources.

Based on an embodiment, in case that the UE actually performs SL transmission based on the configured SL CG type-1 resources, the UE may perform SL transmission by applying a timing advance value proportional to a distance between the base station and the UE. For example, $T_{SL\_CG}$ may be timing of SL CG Type-1 resources. For example, $T_{TA}/2$ may be a timing advance value. In this case, for example, timing at which SL transmission is actually performed may be determined by $T_{SL\_CG}-T_{TA}/2$.

Based on an embodiment, after the UE receives RRC signaling for configuring SL CG type-1 resources from the base station, when the UE performs SL transmission by using the first SL CG type-1 resource, a timing advance value may be reflected in timeDomainOffset once. Or, for example, whenever the UE performs SL transmission by using SL CG type-1 resources, SL transmission timing may be $T_{SL\_CG}-T_{TA}/2$ based on a timing advance value available at SL transmission timing.

Various embodiments described above may be applied to operations in which NR Uu schedules NR SL or NR Uu schedules LTE SL. Or, for example, various embodiments described above may be applied to operations in which LTE Uu schedules NR SL. For example, in case that NR Uu performs scheduling, DL SFN described above may correspond to NR DL SFN. For example, in case that LTE Uu performs scheduling, DL SFN described above may correspond to LTE DL SFN.

Based on an embodiment, in case that the UE performs SL communication on an intelligent transport system dedicated carrier (ITS), a start time of a SL frame corresponding to DFN=0 may be used as a reference time to apply timeDomainOffset described above.

Based on an embodiment, for NR Uu scheduling NR SL, the SL CG type-1 slot may recur associated with each SL slot that satisfies Equation 1.

Equation 1 may be "(frame number×numberOfSlotsPerFrame)+(slot number in the frame)=(timeDomainOffset+N× periodicity) modulo (1024×numberOfSlotsPerFrame)". Herein, N may be all integer greater than or equal to 0 (all integer N>=0). For example, frame number=0 may correspond to the virtual SL frame, of which the first slot is the earliest slot that overlaps in time domain and does not precede NR DL frame of SFN=0. For example, NumberOfSlotsPerFrame and slot number may be determined based on SL numerology. For example, timeDomainOffset may be the offset in SL logical slot to the earliest SL slot, which corresponds to timeDomainOffset=0, that starts not earlier than frame number=0. For example, periodicity may be the period in SL logical slot of the SL configured grant type-1.

Based on an embodiment, the actual SL transmission may occur at $T_{SL\_CG}-T_{TA}/2$. Herein, for example, $T_{SL\_CG}$ may be the timing of the SL slot satisfying the above formula. For example, $T_{TA}/2$ may be the timing advance for NR Uu link.

Based on an embodiment, for LTE Uu scheduling NR SL, same rule used for NR Uu scheduling NR SL may be used. For example, the SL CG type-1 slot may recur associated with each SL slot that satisfies Equation 2.

For example, Equation 2 may be "(frame number× numberOfSlotsPerFrame)+(slot number in the frame)=(timeDomainOffset+N×periodicity) modulo (1024×numberOfSlotsPerFrame)".

Herein, N may be all integer greater than or equal to 0 (all integer N>=0). For example, frame number=0 may correspond to the virtual SL frame, of which the first slot is the earliest slot that overlaps in time domain and does not precede LTE DL frame of SFN=0. For example, NumberOfSlotsPerFrame and slot number may be determined based on SL numerology. For example, timeDomainOffset may be the offset in SL logical slot to the earliest SL slot, which corresponds to timeDomainOffset=0, that starts not earlier than frame number=0. For example, periodicity may be the period in SL logical slot of the SL configured grant type-1.

Based on an embodiment, the actual SL transmission may occur at $T_{SL\_CG}-T_{TA}/2$. Herein, for example, $T_{SL\_CG}$ may be the timing of the SL slot satisfying the above formula. For example, $T_{TA}/2$ may be the timing advance for LTE Uu link.

FIG. 10 shows an example of determining a time when a virtual frame number is 0 from a time when SFN is 0, based on an embodiment of the present disclosure.

Referring to FIG. 10, for NR Uu scheduling NR SL, the SL CG type-1 slot may recur associated to each virtual slot that satisfies Equation 3. For example, Equation 3 may be "(V_frame number×numberOfSlotsPerFrame)+(V_slot number in the V_frame)=(V_slot index of {timeDomainOffset+N x periodicity}) modulo (1024×numberOfSlotsPerFrame)".

Herein, N may be all integer greater than or equal to 0 (all integer N>=0). For example, V_frame and V_slot may be a virtual frame and a virtual slot, and V_frame and V_slot may be based on SL numerology. For example, the first V_slot of the V_frame number=0 may correspond to the earliest physical SL slot that starts not earlier than the start of NR DL frame of SFN=0. For example, V_slot index of logical slot X may mean the V_slot number that corresponds to the logical slot X. For example, NumberOfSlotsPerFrame may be the number of physical SL slots per SL frame. For example, timeDomainOffset may be the offset in SL logical slot to the earliest logical SL slot (e.g., which corresponds to timeDomainOffset=0) that starts not earlier than the start of V_frame number=0. For example, periodicity may be the period in SL logical slot of the SL configured grant type-1.

Based on an embodiment, the actual SL transmission may occur at $T_{SL\_CG}-T_{TA}/2$. Herein, for example, $T_{SL\_CG}$ may be the timing of the SL slot satisfying the above formula. For example, $T_{TA}/2$ may be the timing advance for NR Uu link.

Based on an embodiment, for LTE Uu scheduling NR SL, same rule used for NR Uu scheduling NR SL may be used. For example, the SL CG type-1 slot may recur associated to each virtual slot that satisfies Equation 4. For example, Equation 4 may be "(V_frame number×numberOfSlotsPerFrame)+(V_slot number in the V_frame)=(V_slot index of {timeDomainOffset+N x periodicity}) modulo (1024×numberOfSlotsPerFrame)".

Herein, N may be all integer greater than or equal to 0 (all integer N>=0). For example, V_frame and V_slot may be a virtual frame and a virtual slot, and V_frame and V_slot may be based on SL numerology. For example, the first V_slot of the V_frame number=0 may correspond to the earliest physical SL slot that starts not earlier than the start of LTE DL frame of SFN=0. For example, V_slot index of logical slot X may mean the V_slot number that corresponds to the logical slot X. For example, NumberOfSlotsPerFrame may be the number of physical SL slots per SL frame. For example, timeDomainOffset may be the offset in SL logical slot to the earliest logical SL slot (e.g., which corresponds to timeDomainOffset=0) that starts not earlier than the start of V_frame number=0. For example, periodicity may be the period in SL logical slot of the SL configured grant type-1.

Based on an embodiment, the actual SL transmission may occur at $T_{SL\_CG} - T_{TA}/2$. Herein, for example, $T_{SL\_CG}$ may be the timing of the SL slot satisfying the above formula. For example, $T_{TA}/2$ may be the timing advance for LTE Uu link.

Based on an embodiment, the periodicity may be equally set to a resource reservation period configured in SL mode-2 semi-persistent scheduling (SPS). Based on an embodiment, timeDomainOffset may be set to an integer value from 0 to a maximum value of configurable periodicity values. Based on an embodiment, timeDomainOffset may be set to an integer value from 0 to a maximum value of configured periodicity values.

Based on an embodiment, timeDomainOffset or periodicity represented by in units of the logical slot may be a value represented by logical slots that can be used for SL transmission, UL slots, or UL symbols, which are all candidate resources to which a SL resource pool can be applied.

For example, if timeDomainOffset value is an offset value represented by in units of the logical uplink slot and CG type-1 resources are allocated to the UE, the UE may apply the time of timeDomainOffset from DL SFN=0 or SL DFN=0 based on the logical uplink slot. In addition, for example, after the UE applies the time of timeDomainOffset from DL SFN=0 or SL DFN=0 based on the logical uplink slot, the UE may consider/determine the first available logical SL slot in the time domain as the first SL slot of the CG type-1 resources. For example, the logical SL slot may be a logical SL slot included in a target SL resource pool. For example, the UE may consider/determine the first available logical SL slot in the time domain, among slots located after the time of timeDomainOffset from DL SFN=0 or SL DFN=0 based on the logical uplink slot, as the first SL slot of the CG type-1 resources. For example, the logical SL slot may be a logical SL slot included in a target SL resource pool. In addition, for example, the UE may use the first available logical SL slots, after periodic logical uplink slots having a periodicity value represented by the logical uplink slot based on the time of applying the value of timeDomainOffset represented by the logical uplink slot, as the SL CG type-1 resources. For example, the logical SL slot may be a logical SL slot included in a target SL resource pool.

Based on an embodiment, the UE may expect/determine that a logical uplink slot at the time of applying the value of timeDomainOffset represented by the logical uplink slot is always a SL resource corresponding to a logical SL slot. For example, the logical SL slot may be a logical SL slot included in a target SL resource pool. In addition, for example, the UE may expect/determine that periodic logical uplink slots having a periodicity value represented by the logical uplink slot based on a time at which the value of timeDomainOffset represented by the logical uplink slot is applied are always periodic SL resources corresponding to logical SL slots. For example, the logical SL slot may be a logical SL slot belonging to a target SL resource pool.

Based on an embodiment, timeDomainOffset and periodicity values based on the logical slot may be configured in units of absolute time (e.g., millisecond (ms)). In this case, the absolute time value configured in ms may be converted into a corresponding logical slot. For example, the UE may convert the absolute time value configured in units of ms into units of the logical slot. Herein, for example, the absolute time value may be a value represented by UL logical slots which are all candidate resources to which a SL resource pool can be applied. Or, for example, the absolute time value may be a value represented by logical SL slots to which a SL resource pool is applied. For example, the absolute time value may be a value represented by a logical SL slot to which a target SL resource pool is applied. Or, for example, the absolute time value may be a value represented by logical SL slots to which an entire SL resource pool including a target SL resource pool is applied.

Based on an embodiment, a conversion equation such as Equation 1 may be used. For example, based on Equations 5 and 6, the UE may convert timeDomainOffset and periodicity in units of the logical slot. For example, Equation 5 may be $$OffsetSL = \left\lceil \frac{N}{20 \text{ ms}} \times timeDomainOffset \right\rceil.$$

For example, Equation 6 may be $$PeriodicitySL = \left\lceil \frac{N}{20 \text{ ms}} \times periodicity \right\rceil.$$

For example, the value of N may be the number of logical uplink slots within an absolute time (e.g., 20 ms). Or, for example, the value of N may be the number of logical SL slots within an absolute time (e.g., 20 ms). For example, the logical SL slot may be a logical SL slot belonging to a target SL resource pool. Or, for example, the value of N may be the number of logical SL slots included in an entire SL resource pool including a target SL resource pool within an absolute time (e.g., 20 ms). For example, Equations 5 and 6 may be applied to semi-persistent scheduling (SPS) resource allocation applied to mode-2 operation.

Based on an embodiment, the base station/network may transmit information related to a plurality of SL resource pools to the UE. For example, if a plurality of SL resource pools are configured for the UE, timeDomainOffset and periodicity for the CG type-1 resources may be a value configured in units of the logical SL slot corresponding to the union of all SL resource pools. The CG type-1 resources to be actually used for SL transmission may be determined as logical SL slots included in a target SL resource pool resource that is the closest in time after logical SL slots repeated with periodicity, after timeDomainOffset configured in units of the logical SL slot corresponding to the union of all SL resource pools from DL SFN=0 or SL DFN=0. For example, the UE may determine, as a first time, a time after timeDomainOffset configured in units of the logical SL slot corresponding to the union of all SL resource pools from DL SFN=0 or SL DFN=0. In addition, the UE may determine, as CG type-1 resources, logical SL slots included in a target SL resource pool that is the closest in time after SL logical slots repeated with periodicity from the first time. In addition, the UE may perform SL transmission by using the CG type-1 resources.

Based on an embodiment, resource pool index indication operations associated with SL CG resources may be differently defined/supported for each mode 1 SL CG type. For example, operations indicating a target resource pool index associated with SL CG resources may be differently defined/ supported for each mode 1 SL CG type. Herein, as an example, if the UE performs a SL CG type 2 operation, the UE may expect that a resource pool index associated with SL CG resources is signaled. On the other hand, if the UE performs a SL CG type 1 operation, the UE may not expect that a resource pool index associated with SL CG resources is signaled. For example, if the UE performs a SL CG type 2 operation, the UE may expect that a target resource pool index associated with scheduled SL CG resources is signaled through mode 1 DCI. On the other hand, if the UE performs a SL CG type 1 operation, the UE may not expect that a target resource pool index associated with scheduled SL CG resources is signaled through mode 1 DCI. For example, in the case of SL CG type 1, if a plurality of mode 1 transmission resource pools are configured, the UE may consider that a resource pool associated with SL CG resources is a resource pool which occurs the earliest after a slot offset. For example, in the case of SL CG type 1, if a plurality of MODE 1 transmission resource pools are configured, the UE may consider that a target resource pool associated with SL CG resources is a resource pool which occurs the earliest after a logical slot offset. For example, the slot offset value may be counted as the number of SL slots belonging to a resource pool or the number of UL slots that can be used/configured as a resource pool for SL transmission.

In the present disclosure, in case that the base station configures CG type-1 resources for the UE, if the difference occurs between the timing in which SFN is 0 according to Uu link timing and the timing in which DFN is 0 according to SL timing, the UE may interpret information regarding the CG type-1 configuration received through RRC signaling according to various embodiments, in order for the base station and the UE to have the same understanding of the timing of the CG type-1 resources.

Meanwhile, in SL mode-1 operation, in case that the base station configures periodic resources to the UE based on configured grant (CG) type-1 or CG type-2, the base station may configure a period and an offset of the CG resources to the UE through RRC signaling. In this case, for example, since a SL operation of the UE uses direct frame number (DFN)-based timing unlike an operation in Uu link, system frame number (SFN)-based timing used in Uu link for communication between the base station and the UE may not be synchronized with DFN-based timing.

As described above, in the present disclosure, a problem may occur in which a time corresponding to SFN=0 based on Uu link timing and a time corresponding to DFN=0 based on SL timing are not aligned with each other. For this reason, proposed is a method for resolving ambiguity in which an HARQ process ID is differently interpreted between the base station and the UE, for the HARQ process ID generated by the base station based on the time corresponding to SFN=0.

For example, in order to generate an HARQ process ID for SL CG type-1 resources or SL CG type-2 resources, the base station may pre-configure or configure nrofHARQ-Process indicating the total number of HARQ process IDs and periodicity repeated between CG resources to the UE through higher layer signaling as CG configuration information.

Based on an embodiment, the base station may generate a SL HARQ process ID as shown in Equation 7 based on the values of nrofHARQ-Process and periodicity. For example, Equation 7 may be "SL HARQ Process ID=[floor(SL slot number/periodicity)] modulo nrofHARQ-Processes".

Based on an embodiment, in Equation 7, the sidelink slot number (hereinafter, SL slot number) may be the number of SL slots existing from the start time of a frame corresponding to frame number=0 to the current slot (hereinafter, CURRENT_slot). Or, for example, the SL slot number may be a value obtained by subtracting 1 from the number of SL slots existing from the start time of a frame corresponding to frame number=0 to the time of CURRENT_slot.

Based on an embodiment, the frame corresponding to frame number=0 may be a DL frame corresponding to DL SFN=0 or a SL frame corresponding to SL DFN=0.

Based on an embodiment, the frame corresponding to frame number=0 may be a physical sidelink frame which is the earliest in time from the start time of a DL frame corresponding to DL SFN=0 when SL numerology and SL DFN timing are applied.

Based on an embodiment, the frame corresponding to frame number=0 may be a virtual physical sidelink frame having the earliest physical slot or symbol in time from the start time of a DL frame corresponding to DL SFN=0, as the first slot or the first symbol of the frame, when SL numerology is applied.

Based on an embodiment, the start time of the frame corresponding to frame number=0 may be pre-defined as the start time of a DL frame corresponding to DL SFN=0. Or, for example, the start time of the frame corresponding to frame number=0 may be pre-configured by the network or may be a value obtained by adding a configured offset value.

Based on an embodiment, the start time of the frame corresponding to frame number=0 may be pre-defined as the start time of a DL frame corresponding to SL SFN=0. Or, for example, the start time of the frame corresponding to frame number=0 may be pre-configured by the network or may be a value obtained by adding a configured offset value.

Based on an embodiment, in order to determine the start time of the frame corresponding to frame number=0, the UE may assume/expect that a time corresponding to SFN=0 used by the base station and a time corresponding to DFN=0 used for SL communication are the same.

Based on an embodiment, CURRENT_slot may be determined by Equation 8. That is, for example, CURRENT_slot may be determined based on a frame number, the number of physical sidelink slots per frame, and the slot number of SL slots including the CG resources that is the target for generating an HARQ process ID. For example, the frame number may be a frame number of a frame configured in consideration of the number of subframes and slots based on SL numerology with respect to the time corresponding to frame number=0. For example, Equation 8 may be "CURRENT_slot=(frame number X numberOfSlotsPerFrame+ slot number in the frame)".

Based on an embodiment, if a plurality of SL CG resources configured for each SL CG resource period exist, CURRENT_slot may be a slot number of a slot corresponding to the first CG resource in a SL CG resource period. Or, for example, CURRENT_slot may be a slot number of a slot corresponding to the last CG resource in a SL CG resource period. Or, for example, CURRENT_slot may be a slot number of a slot predefined or pre-configured by higher layer signaling within a SL CG period. Or, for example, CURRENT_slot may be a slot number of a slot corresponding to a CG resource corresponding to a configured order. That is, for example, all SL CG resources within a SL CG resource period may have the same CURRENT_slot value, and thus, the same SL HARQ process ID may be configured for all SL CG resources within the SL CG resource period.

Based on an embodiment, when counting the number of SL slots existing from the start time of the frame corresponding to frame number=0 to the time of CURRENT_slot, the number of SL slots may be the number of physical SL slots, or the number of logical SL slots included in a SL resource pool.

Based on an embodiment, numberOfSlotsPerFrame may be the number of physical SL slots per physical SL frame based on SL numerology.

Based on an embodiment, the base station may generate a SL HARQ process ID in the following way.

For example, for generation of the SL HARQ process ID in SL DCI, NR Uu rule may be reused. For example, the SL HARQ process ID may be determined by Equation 9. For example, Equation 9 may be "SL HARQ Process ID=[floor (SL slot number/periodicity)] modulo nrofHARQ-Processes". Herein, for example, the SL slot number may be the number of the logical SL slots from frame number=0 to the CURRENT_slot=(frame number×numberOfSlotsPerFrame+slot number in the frame). For example, CURRENT_ slot may refer to the slot index of the first SL transmission occasion per CG period.

For example, frame number=0 may correspond to the virtual SL frame, of which the first slot is the earliest slot that overlaps in time domain and does not precede NR DL frame of SFN=0. For example, the NR DL frame may be LTE DL frame of SFN=0 in case of LTE Uu scheduling NR SL. For example, NumberOfSlotsPerFrame and slot number may be determined based on SL numerology. For example, periodicity may be the period in slot of the SL configured grant.

In the present disclosure, in case that the SL HARQ process ID for SL CG resources is generated based on the timing used by the base station, proposed is a method for solving the ambiguity problem caused by the difference in understanding of the SL HARQ process ID between the base station and the UE, if the timing corresponding to DFN=0 used by the UE and the timing corresponding to SFN=0 used by the base station are not aligned with each other. Various embodiments proposed in the present disclosure may be commonly used to generate the SL HARQ process ID for SL CG type-1 resources and SL CG type-2 resources.

Figure 11:
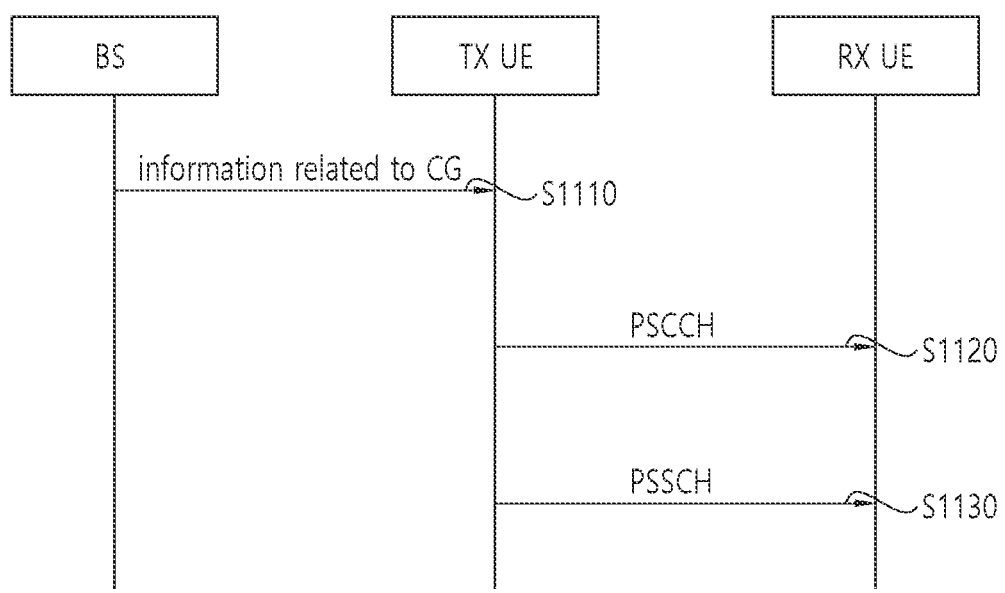
FIG. 11 shows a procedure in which a transmitting UE performs sidelink transmission based on CG-related information, based on an embodiment of the present disclosure.
Figure 12:
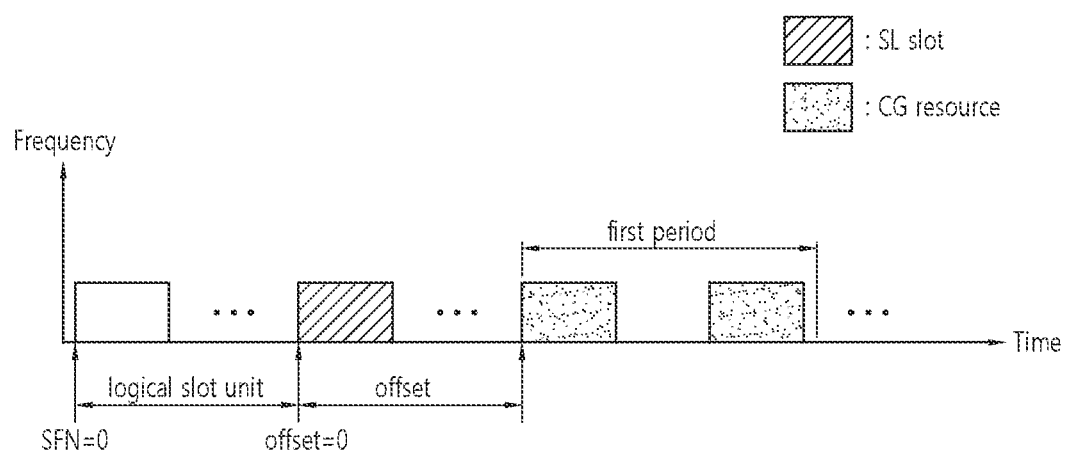
FIG. 12 shows an example of a period related to CG and an offset related to CG, based on an embodiment of the present disclosure.
Figure 13:
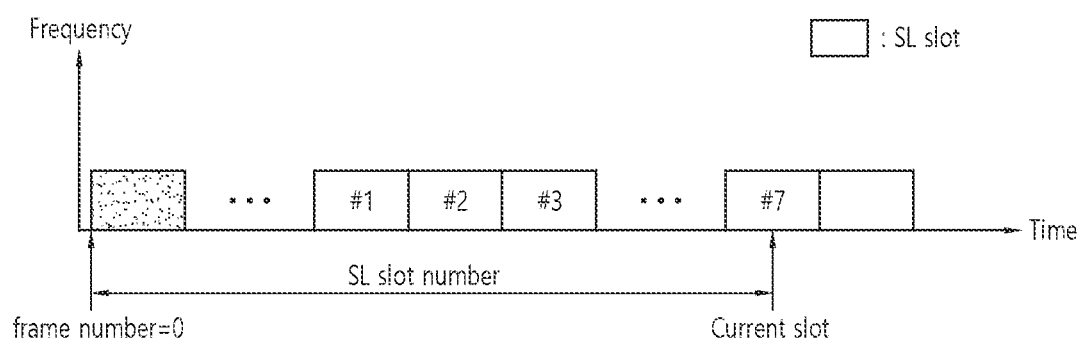
FIG. 13 shows an example of a current slot for generating an HARQ process ID, based on an embodiment of the present disclosure.

FIG. 11 shows a procedure in which a transmitting UE performs sidelink transmission based on CG-related information, based on an embodiment of the present disclosure. FIG. 12 shows an example of a period related to CG and an offset related to CG, based on an embodiment of the present disclosure. FIG. 13 shows an example of a current slot for generating an HARQ process ID, based on an embodiment of the present disclosure. Embodiments of FIGS. 11 to 13 may be combined with various embodiments of the present disclosure.

Referring to FIG. 11, in step S1110, the base station may transmit CG-related information to the transmitting UE. For example, the CG-related information may be information for scheduling sidelink resources. For example, the CG-related information may include information regarding an offset related to CG and information regarding a period related to CG.

In step S1120, the transmitting UE may transmit a PSCCH to the receiving UE, based on a sidelink resource allocated by CG based on the CG-related information. In step S1130, the transmitting UE may transmit a PSSCH related to the PSCCH to the receiving UE, based on the sidelink resource allocated by CG based on the CG-related information. For example, the transmitting UE may perform sidelink transmission to the receiving UE based on the sidelink resource allocated by CG based on the CG-related information. For example, the sidelink transmission may include PSCCH transmission or PSSCH transmission. For example, the sidelink resource allocated by CG may be located after the offset related to CG from the closest logical sidelink slot after a time corresponding to system frame number (SFN) =0. For example, the time corresponding to SFN=0 and a time corresponding to direct frame number (DFN)=0 may be different. For example, sidelink resources allocated by CG may be repeated in the period related to CG. For example, the period related to CG and the offset related to CG may be in units of a logical sidelink slot. For example, the logical sidelink slot may be a resource in a sidelink resource pool. For example, the logical sidelink slot may be a value obtained by converting absolute time.

Referring to FIG. 12, sidelink resources allocated by CG may be referred to as CG resources. For example, a time corresponding to offset=0 may correspond to the closest logical sidelink slot after a time corresponding to SFN=0. For example, a CG resource may be located after the offset from the time corresponding to offset=0. For example, the CG resource may be a sidelink resource included in a first period. For example, the offset value and the first period value may be units of the logical sidelink slot. For example, the CG resource may be located after the offset from the closest logical sidelink slot after the time corresponding to SFN=0. For example, based on scheduling sidelink resources by the base station in LTE Uu link, SFN may be LTE SFN.

For example, a physical slot unit may be an absolute time unit. For example, physical slots may include an uplink-related slot, a downlink-related slots, and a sidelink-related slots. In addition, a logical slot unit may be a time unit based on a sidelink slot. For example, the logical slot may include only sidelink slot. For example, the closest logical sidelink slot may be the time at which the offset related to CG is 0. For example, based on scheduling sidelink resources by the base station in LTE Uu link, SFN may be LTE SFN.

For example, the transmitting UE may perform sidelink transmission to the receiving UE based on sidelink resources allocated by CG based on half of a timing advance value. For example, half of the timing advance value may be applied to the offset related to CG. For example, sidelink resources allocated by CG may be located after the offset related to CG to which half of the timing advance value is applied from the closest logical sidelink slot after the time corresponding to SFN=0. For example, it may be performed for each sidelink transmission based on sidelink resources allocated by CG based on half of the timing advance value. The transmitting UE may apply half of the timing advance value to each sidelink transmission and perform sidelink transmission based on sidelink resources allocated by CG to the receiving UE.

For example, the transmitting UE may receive information related to a plurality of sidelink resource pools from the base station or the network. For example, the logical sidelink slot may be a union of the plurality of sidelink resource pools.

For example, operations of indicating an index of a resource pool related to sidelink resources allocated by CG may be different based on a type of CG. For example, based on that the type of CG is type 2, an index of a resource pool related to sidelink resources allocated by CG may be signaled.

For example, an HARQ process ID related to a sidelink resource may be configured based on Equations 7 and 8 above. The HARQ process ID related to the sidelink resource may be configured based on a sidelink slot number, the period related to CG, and the total number of HARQ process IDs. For example, the sidelink slot number may be the number of sidelink slots existing from the start of a frame to a current slot. For example, the sidelink slot number may be a value obtained by subtracting 1 from the number of sidelink slots existing from the start of the frame to the current slot. For example, the current slot may be configured based on the frame number based on the start time of the frame, the number of sidelink slots per frame, and the slot number of the sidelink slot including sidelink resources related to the HARQ process ID. For example, the number of sidelink slots may be the number of logical sidelink slots included in a sidelink resource pool.

For example, an HARQ process ID related to a sidelink resource may be configured based on a periodicity repeated between CG resources, the total number of HARQ process IDs, and the sidelink slot number. In this case, the sidelink slot number may be the number of sidelink slots existing from the start frame having a frame number of 0 to the current slot. Or, the sidelink slot number may be a value obtained by subtracting 1 from the number of sidelink slots existing from the start frame having a frame number of 0 to the current slot.

Referring to FIG. 13, the sidelink slot number may be the number of sidelink slots existing from the start frame having a frame number of 0 to the current slot. For example, if the number of sidelink slots existing from the start frame having a frame number of 0 to the current slot is 7, the sidelink slot number may be 7. Or, for example, if the number of sidelink slots existing from the start frame having a frame number of 0 to the current slot is 7, the sidelink slot number may be 6. For example, when counting the number of sidelink slots existing from the start frame having a frame number of 0 to the current slot, the number of sidelink slots may be the number of logical sidelink slots included in the sidelink resource pool.

Figure 14:
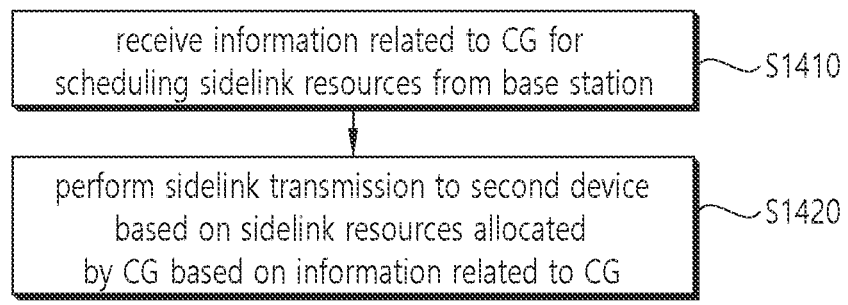
FIG. 14 shows a method for performing, by a first device, sidelink transmission to a second device based on CG-related information, based on an embodiment of the present disclosure.

FIG. 14 shows a method for performing, by a first device, sidelink transmission to a second device based on CG-related information, based on an embodiment of the present disclosure. The embodiment of FIG. 14 may be combined with various embodiments of the present disclosure.

Referring to FIG. 14, in step S1410, the first device 100 may receive information related to a configured grant (CG) for scheduling sidelink resources from a base station. For example, the information related to the CG may be information for scheduling sidelink resources. For example, the information related to the CG may include information on an offset related to the CG and information on a period related to the CG.

In step S1420, the first device 100 may perform sidelink transmission to the second device 200 based on sidelink resources allocated by the CG based on the information related to the CG. For example, the sidelink resources allocated by the CG may be located after the offset related to the CG from the closest logical sidelink slot after a time when system frame number (SFN) is 0. For example, the time when SFN is 0 and a time when direct frame number (DFN) is 0 may be different. For example, sidelink resources allocated by the CG may be repeated in the period related to the CG. For example, the period related to the CG and the offset related to the CG may be in units of a logical sidelink slot. For example, the logical sidelink slot may be a resource in a sidelink resource pool. For example, the logical sidelink slot may be a value obtained by converting absolute time. For example, the closest logical sidelink slot may be a time when the offset related to the CG is 0. For example, based on the base station scheduling sidelink resources through LTE Uu link, the SFN may be LTE SFN.

For example, the first device 100 may perform sidelink transmission based on sidelink resources allocated by the CG to the second device 200 based on half of a timing advance value. For example, half of the timing advance value may be applied to the offset related to the CG. For example, sidelink resources allocated by the CG may be located after the offset related to the CG to which half of the timing advance value is applied from the closest logical sidelink slot after the time when system frame number (SFN) is 0. For example, it may be performed for each sidelink transmission based on sidelink resources allocated by the CG based on half of the timing advance value. For example, the first device 100 may apply half of the timing advance value to each sidelink transmission and perform sidelink transmission based on sidelink resources allocated by the CG to the second device 200.

For example, the first device 100 may receive information related to a plurality of sidelink resource pools from a base station or a network. For example, logical sidelink slots may be a union of the plurality of sidelink resource pools.

For example, an operation of indicating an index of a resource pool related to sidelink resources allocated by the CG may be different based on a type of the CG. For example, based on that the type of the CG is a type 2, an index of a resource pool related to sidelink resources allocated by the CG may be signaled.

For example, an HARQ process ID related to sidelink resources may be configured based on Equations 7 and 8 above. The HARQ process ID related to sidelink resources may be configured based on a sidelink slot number, the period related to the CG, and the total number of HARQ process IDs. For example, the sidelink slot number may be the number of sidelink slots existing from the start of a frame to a current slot. For example, the sidelink slot number may be a value obtained by subtracting 1 from the number of sidelink slots existing from the start of the frame to the current slot. For example, the current slot may be configured based on a frame number based on the start time of the frame, the number of sidelink slots per frame, and a slot number of sidelink slots including sidelink resources related to an HARQ process ID. For example, the number of sidelink slots may be the number of logical sidelink slots included in a sidelink resource pool.

For example, an HARQ process ID related to sidelink resources may be configured based on a periodicity repeated between CG resources, the total number of HARQ process IDs, and a sidelink slot number. In this case, the sidelink slot number may be the number of sidelink slots existing from the start frame in which a frame number is 0 to a current slot. Or, the sidelink slot number may be a value obtained by subtracting 1 from the number of sidelink slots existing from the start frame in which a frame number is 0 to a current slot.

The above-described embodiment can be applied to various devices described below. For example, the processor 102 of the first device 100 may control the transceiver 106 to receive information related to a configured grant (CG) for scheduling sidelink resources from a base station. In addition, the processor 102 of the first device 100 may control the transceiver 106 to transmit a PSCCH to the second device 200 based on the CG. In addition, the processor 102 of the first device 100 may control the transceiver 106 to perform sidelink transmission to the second device 200 based on sidelink resources allocated by the CG based on the information related to the CG.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a configured grant (CG) for scheduling sidelink resources; and perform, to a second device, sidelink transmission based on the sidelink resources allocated by the CG based on the information related to the CG. For example, the information related to the CG may include information on an offset related to the CG and information on a period related to the CG. For example, the sidelink resources allocated by the CG may be located after the offset related to the CG from a closest logical sidelink slot after a time when a system frame number (SFN) is 0. For example, the sidelink resources allocated by the CG may be repeated in the period related to the CG. For example, the period related to the CG and the offset related to the CG may be units of a logical sidelink slot. For example, the logical sidelink slot may be a resource in a sidelink resource pool.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: receive, from a base station, information related to a configured grant (CG) for scheduling sidelink resources; and perform, to a second UE, sidelink transmission based on the sidelink resources allocated by the CG based on the information related to the CG. For example, the information related to the CG may include information on an offset related to the CG and information on a period related to the CG. For example, the sidelink resources allocated by the CG may be located after the offset related to the CG from a closest logical sidelink slot after a time when a system frame number (SFN) is 0. For example, the sidelink resources allocated by the CG may be repeated in the period related to the CG. For example, the period related to the CG and the offset related to the CG may be units of a logical sidelink slot. For example, the logical sidelink slot may be a resource in a sidelink resource pool.

Based on an embodiment of the present disclosure, anon-transitory computer-readable storage medium storing instructions may be provided. For example, the instructions, when executed, may cause a first device to: receive, from a base station, information related to a configured grant (CG) for scheduling sidelink resources; and perform, to a second device, sidelink transmission based on the sidelink resources allocated by the CG based on the information related to the CG. For example, the information related to the CG may include information on an offset related to the CG and information on a period related to the CG. For example, the sidelink resources allocated by the CG may be located after the offset related to the CG from a closest logical sidelink slot after a time when a system frame number (SFN) is 0. For example, the sidelink resources allocated by the CG may be repeated in the period related to the CG. For example, the period related to the CG and the offset related to the CG may be units of a logical sidelink slot. For example, the logical sidelink slot may be a resource in a sidelink resource pool.

Figure 15:
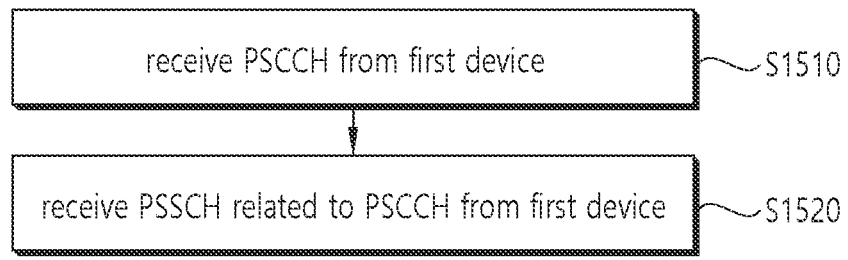
FIG. 15 shows a method for receiving, by a second device, a PSCCH or a PSSCH related to the PSCCH from a first device, based on an embodiment of the present disclosure.

FIG. 15 shows a method for receiving, by a second device, a PSCCH or a PSSCH related to the PSCCH from a first device, based on an embodiment of the present disclosure. The embodiment of FIG. 15 may be combined with various embodiments of the present disclosure.

Referring to FIG. 15, in step S1510, the second device 200 may receive a physical sidelink control channel (PSCCH) from the first device 100. In step S1520, the second device 200 may receive a physical sidelink shared channel (PSSCH) related to the PSCCH from the first device 100.

For example, the PSCCH and the PSSCH related to the PSCCH may be received by the second device 200 from the first device 100, based on sidelink resources allocated by to a configured grant (CG) based on information related to the CG received from the base station. For example, the information related to the CG may be information for scheduling sidelink resources. For example, the information related to the CG may include information on an offset related to the CG and information on a period related to the CG. For example, sidelink resources allocated by the CG may be located after the offset related to the CG from the closest logical sidelink slot after a time when system frame number (SFN) is 0. For example, the time when SFN is 0 and a time when direct frame number (DFN) is 0 may be different. For example, sidelink resources allocated by the CG may be repeated in the period related to the CG. For example, the period related to the CG and the offset related to the CG may be in units of a logical sidelink slot. For example, the logical sidelink slot may be a resource in a sidelink resource pool. For example, the logical sidelink slot may be a value obtained by converting absolute time. For example, the closest logical sidelink slot may be a time when the offset related to the CG is zero. For example, based on the base station scheduling sidelink resources through LTE Uu link, the SFN may be LTE SFN.

For example, sidelink transmission may be performed based on sidelink resources allocated by the CG based on half of a timing advance value. For example, half of the timing advance value may be applied to the offset related to the CG. For example, sidelink resources allocated by the CG may be located after the offset related to the CG to which half of the timing advance value is applied from the closest logical sidelink slot after the time when system frame number (SFN) is 0. For example, it may be performed for each sidelink transmission based on sidelink resources allocated by the CG based on half of the timing advance value. For example, half of the timing advance value may be applied to each sidelink transmission, and sidelink transmission may be performed based on sidelink resources allocated by the CG.

For example, the first device 100 may receive information related to a plurality of sidelink resource pools from a base station or a network. For example, logical sidelink slots may be a union of the plurality of sidelink resource pools.

For example, an operation of indicating an index of a resource pool related to sidelink resources allocated by the CG may be different based on a type of the CG. For example, based on that the type of the CG is a type 2, an index of a resource pool related to sidelink resources allocated by the CG may be signaled.

For example, an HARQ process ID related to sidelink resources may be configured based on Equations 7 and 8 above. The HARQ process ID related to sidelink resources may be configured based on a sidelink slot number, the period related to the CG, and the total number of HARQ process IDs. For example, the sidelink slot number may be the number of sidelink slots existing from the start of a frame to a current slot. For example, the sidelink slot number may be a value obtained by subtracting 1 from the number of sidelink slots existing from the start of the frame to the current slot. For example, the current slot may be configured based on a frame number based on the start time of the frame, the number of sidelink slots per frame, and a slot number of sidelink slots including sidelink resources related to an HARQ process ID. For example, the number of sidelink slots may be the number of logical sidelink slots included in a sidelink resource pool.

For example, an HARQ process ID related to sidelink resources may be configured based on a periodicity repeated between CG resources, the total number of HARQ process IDs, and a sidelink slot number. In this case, the sidelink slot number may be the number of sidelink slots existing from the start frame in which a frame number is 0 to a current slot. Or, the sidelink slot number may be a value obtained by subtracting 1 from the number of sidelink slots existing from the start frame in which a frame number is 0 to a current slot.

The above-described embodiment can be applied to various devices described below. For example, the processor 202 of the second device 200 may control the transceiver 206 to receive a PSCCH from the first device 100. In addition, the processor 202 of the second device 200 may control the transceiver 206 to receive a PSSCH related to the PSCCH from the first device 100.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a physical sidelink control channel (PSCCH); and receive, from the first device, a physical sidelink shared channel (PSSCH) related to the PSCCH. For example, the PSCCH and the PSSCH related to the PSCCH may be received by the second device from the first device, based on sidelink resources allocated by a configured grant (CG) based on information related to the CG received from a base station. For example, the information related to the CG may include information on an offset related to the CG and information on a period related to the CG. For example, the sidelink resources allocated by the CG may be located after the offset related to the CG from a closest logical sidelink slot after a time when a system frame number (SFN) is 0. For example, the sidelink resources allocated by the CG may be repeated in the period related to the CG. For example, the period related to the CG and the offset related to the CG may be units of a logical sidelink slot. For example, the logical sidelink slot may be a resource in a sidelink resource pool.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
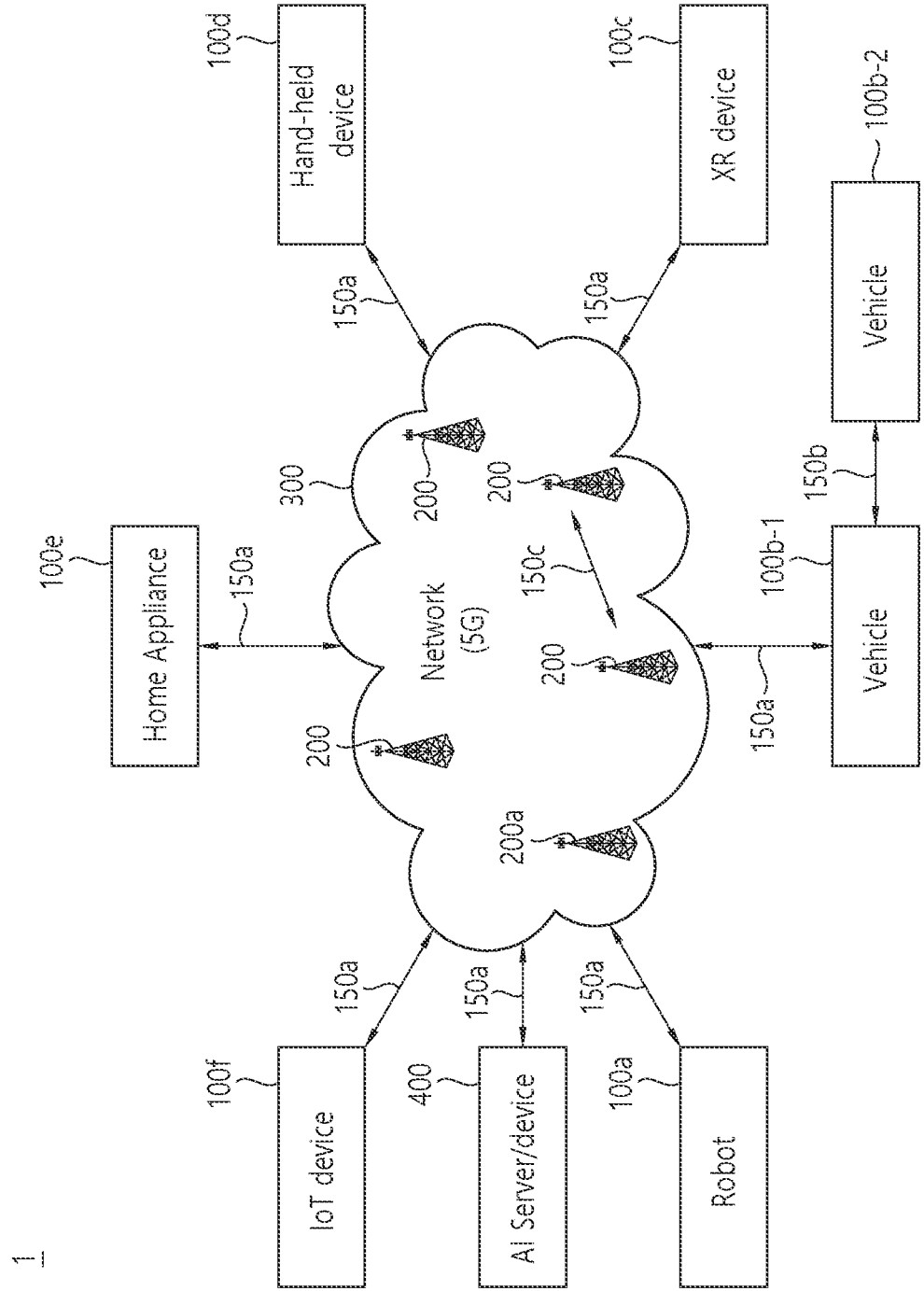
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
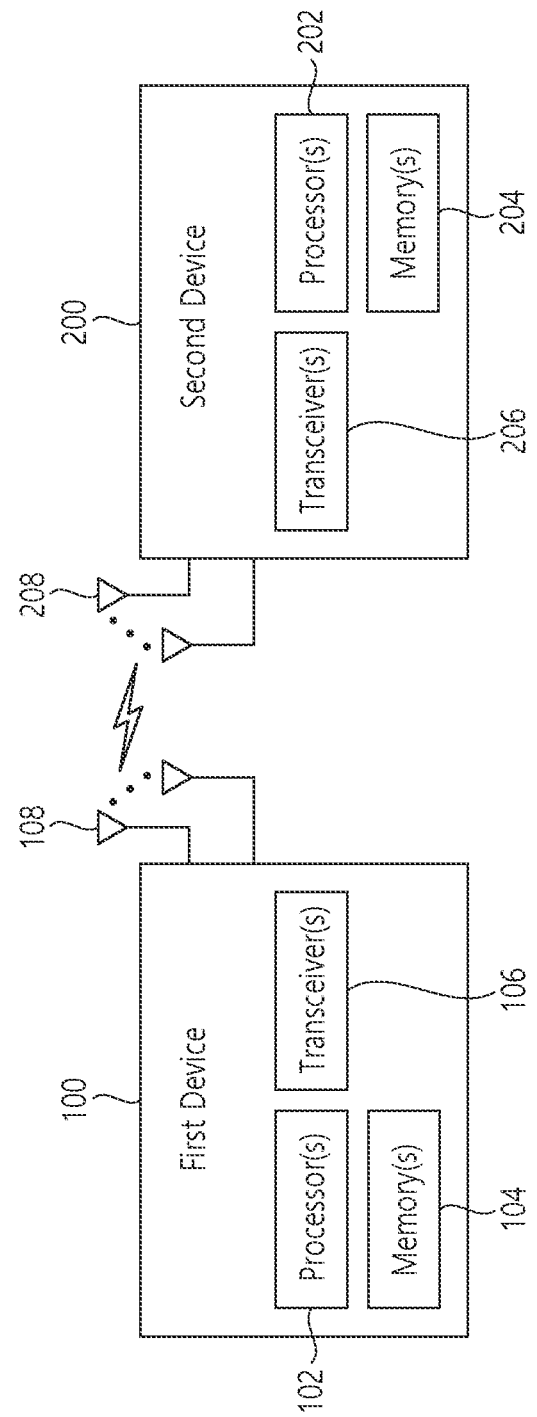
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
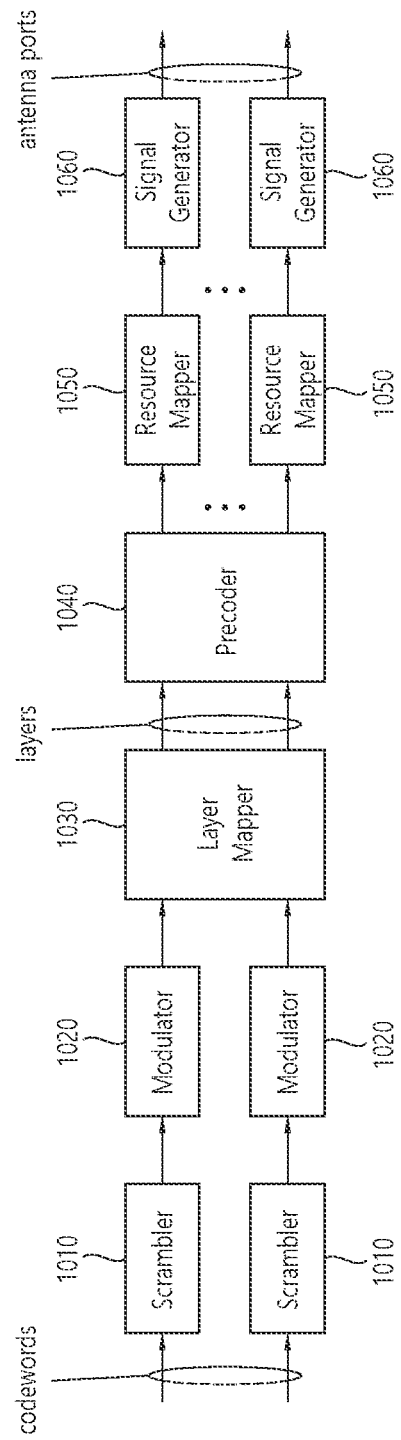
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
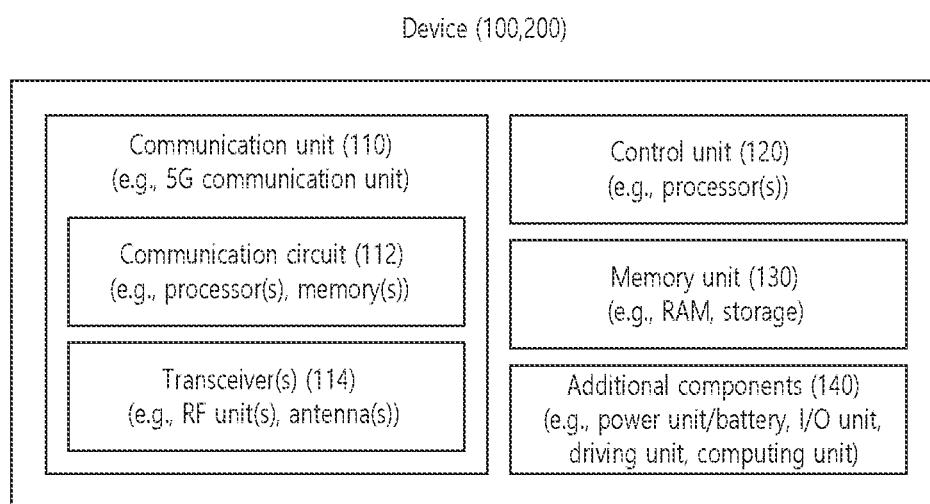
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
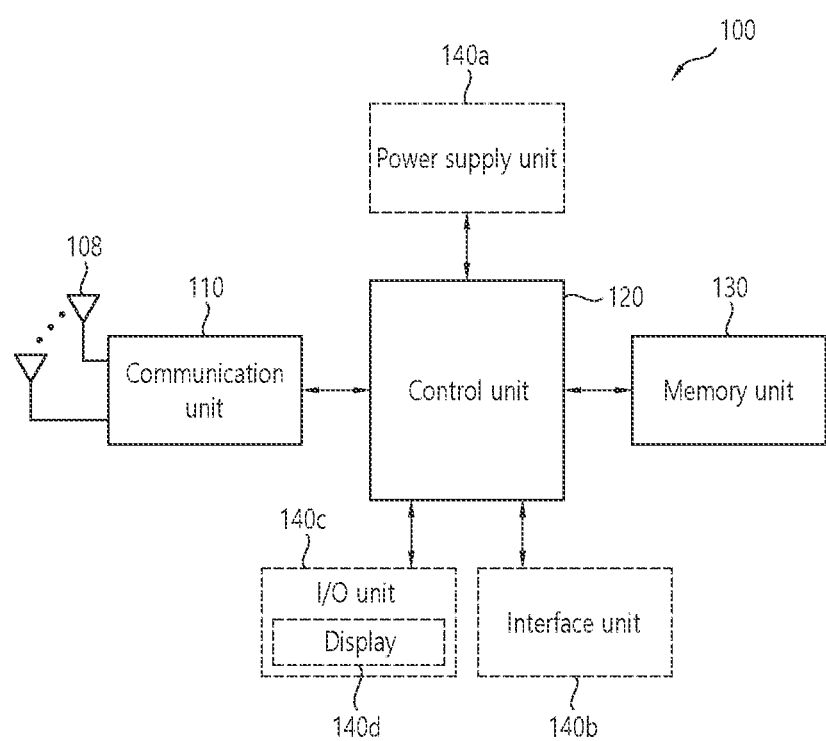
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
receiving, from a base station, information related to a configured grant (CG) for scheduling a sidelink resource; and
performing, to a second device, sidelink transmission based on the sidelink resource allocated by the CG,
wherein the information related to the CG includes information on an offset related to the CG and information on a period related to the CG,
wherein the sidelink resource allocated by the CG is located after the offset related to the CG from a reference logical slot,
wherein the reference logical slot is a 1st logical slot of a sidelink resource pool after a time when a system frame number (SFN) is 0,
wherein the sidelink resource allocated by the CG is repeated with the period related to the CG,
wherein the period related to the CG and the offset related to the CG are units of a logical sidelink slot, and
wherein the logical sidelink slot is a resource in the sidelink resource pool.

2. The method of claim 1, wherein the time when the SFN is 0 and a time when a direct frame number (DFN) is 0 are different.

3. The method of claim 1, wherein the sidelink transmission based on the sidelink resources allocated by the CG is performed based on half of a timing advance value.

4. The method of claim 3, wherein the half of the timing advance value is applied to the offset related to the CG.

5. The method of claim 1, wherein each sidelink transmission based on the sidelink resources allocated by the CG is performed based on half of a timing advance value.

6. The method of claim 1, wherein the logical sidelink slot is a value obtained by converting absolute time.

7. The method of claim 1, further comprising:
receiving, from the base station or a network, information related to a plurality of sidelink resource pools,
wherein the logical sidelink slot is a resource in a union of the plurality of sidelink resource pools.

8. The method of claim 1, wherein the 1st logical slot is a time when the offset related to the CG is 0.

9. The method of claim 1, wherein an operation of indicating an index of a resource pool related to the sidelink resources allocated by the CG based on a type of the CG is different.

10. The method of claim 1, wherein an HARQ process ID related to the sidelink resources is configured based on a sidelink slot number, the period related to the CG, and a total number of HARQ process IDs.

11. The method of claim 10, wherein the sidelink slot number is a number of sidelink slots existing from a start of a frame to a current slot, and wherein the current slot is configured based on a frame number based on a start time of the frame, a number of sidelink slots per frame, and a slot number of a sidelink slot including a sidelink resource related to the HARQ process ID.

12. The method of claim 11, wherein the number of sidelink slots is a number of logical sidelink slots included in a sidelink resource pool.

13. The method of claim 10, wherein the sidelink slot number is a value obtained by subtracting 1 from a number of sidelink slots existing from a start of a frame to a current slot, and
wherein the current slot is configured based on a frame number based on a start time of the frame, a number of sidelink slots per frame, and a slot number of a sidelink slot including a sidelink resource related to the HARQ process ID.

14. The method of claim 13, wherein the number of sidelink slots is a number of logical sidelink slots included in a sidelink resource pool.

15. A first device adapted to perform wireless communication, the first device comprising:
at least one transceiver;
at least one processor; and
at least one memory connected to the at least one processor and storing instructions that, based on being executed by the at least one processor, perform operations comprising:
receiving, from a base station, information related to a configured grant (CG) for scheduling a sidelink resource; and
performing, to a second device, sidelink transmission based on the sidelink resource allocated by the CG,
wherein the information related to the CG includes information on an offset related to the CG and information on a period related to the CG,
wherein the sidelink resource allocated by the CG is located after the offset related to the CG from a reference logical slot,
wherein the reference logical slot is a 1st logical slot of a sidelink resource pool after a time when a system frame number (SFN) is 0,
wherein the sidelink resource allocated by the CG is repeated with the period related to the CG,
wherein the period related to the CG and the offset related to the CG are units of a logical sidelink slot, and
wherein the logical sidelink slot is a resource in the sidelink resource pool.

16. A processing device adapted to control a first device, the processing device comprising:
at least one processor; and
at least one memory connected to the at least one processor and storing instructions that, based on being executed by the at least one processor, perform operations comprising:
receiving, from a base station, information related to a configured grant (CG) for scheduling a sidelink resource; and
performing, to a second device, sidelink transmission based on the sidelink resource allocated by the CG,
wherein the information related to the CG includes information on an offset related to the CG and information on a period related to the CG,
wherein the sidelink resource allocated by the CG is located after the offset related to the CG from a reference logical slot,
wherein the reference logical slot is a 1st logical link slot of a sidelink resource pool after a time when a system frame number (SFN) is 0,
wherein the sidelink resource allocated by the CG is repeated with the period related to the CG,
wherein the period related to the CG and the offset related to the CG are units of a logical sidelink slot, and
wherein the logical sidelink slot is a resource in the sidelink resource pool.

* * * * *